United States Patent Office.

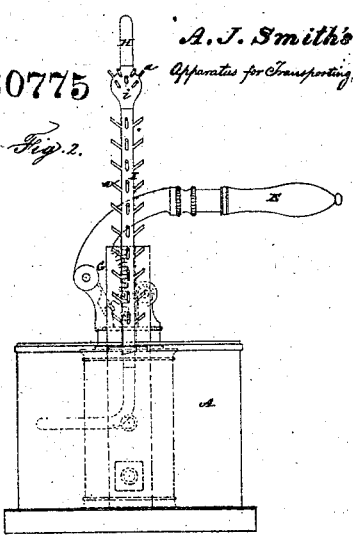
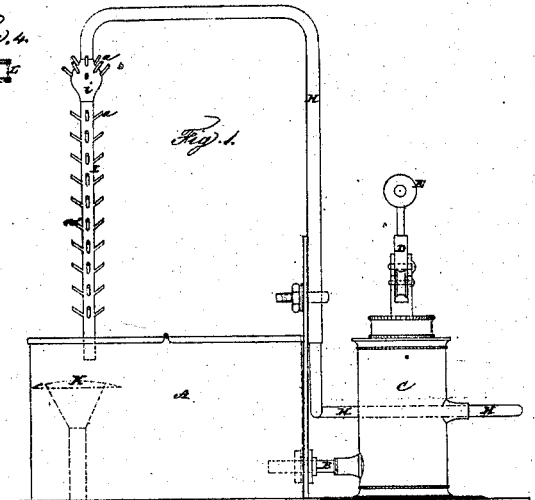
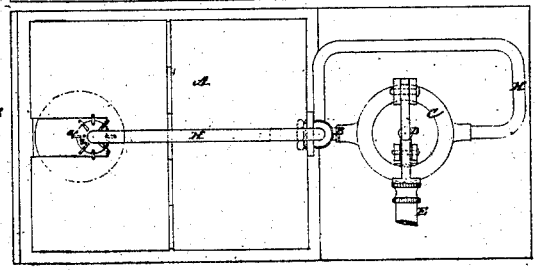
A. J. Smith's Apparatus for Transporting Fish.
No. 80775

ANTON JULIUS SMIDTH, OF COPENHAGEN, DENMARK.

Letters Patent No. 80,775, dated August 4, 1868.

IMPROVEMENT IN CONVEYING LIVE FISHES.

*The Schedule referred to in these Letters Patent and making part of the same.*

TO ALL TO WHOM IT MAY CONCERN:

Be it known that I, ANTON JULIUS SMIDTH, of Copenhagen, in the Kingdom of Denmark, have invented Improved Appliances and Means for Conveying Salt-Water Fish through fresh water, and overland, and on land; and I do hereby declare that the following is a full and exact description thereof, reference being had to the accompanying sheet of drawings, and to the letters of reference marked thereon.

Figure 1 represents a side elevation of my improved appliances.

Figure 2, an end elevation at A, fig. 1.

Figure 3, a top plan view of fig. 1.

The nature of my said invention consists in pumping or otherwise forcing air into sea-water, contained in tanks, in which salt-water fish are placed for conveying them to market, the intention of this invention being to keep the fish alive whilst they are being conveyed through fresh water, and overland, and on land.

According to the means hitherto employed for conveying salt-water fish through fresh water, notwithstanding such said fish have been kept in salt or sea-water during such transit, in consequence of the water being deprived of the greater portion of the oxygen contained therein, by the fish, to support animation thereof, the fish die, and become, consequently, much deteriorated in value. Now, the object and intention of this invention are to remedy this objection, which I propose to effect by the following appliances and means:

As regards vessels constructed with wells, for conveying fish through sea-water, I propose to so construct such said wells as that the perforations therein may be closed or shut off when the vessel comes into fresh water. I propose, also, to adapt a pipe horizontally within such said well, near the bottom thereof, and connect it with a lift and force-pump, to which is also connected an upright pipe, terminating at the top in a reservoir, from the bottom of which another upright pipe passes into the well containing the fish. This last-mentioned pipe I propose to perforate with holes, inclining upwards, so that when the aforesaid pump is put into motion, the effect will be to raise the water from the well in which the fish are into the aforesaid reservoir, and the water thus raised will pass thence, down the perforated pipe before mentioned, into the aforesaid well, and during such time, the external atmospheric air, entering through the perforations in the pipe, will mix with the water as it passes into the well, and thus charge the water in the well with atmospheric air, thereby keeping up the element of which the water is deprived by the fish to support vitality. In conveying salt-water fish overland or by railway, I propose to fit the trucks or carriages with tanks, containing sea-water, and force air thereinto, as above stated, or by any other suitable means.

To enable others skilled in the art to make and use my invention, I will proceed to describe its construction and operation, as follows:

A A is a water-tight tank or vessel, intended to contain salt-water fish; B, a pipe, leading therefrom, and connected to the barrel of a pump, C, fitted with a foot-valve and bucket, or piston and rod, D; E, the pump-handle, formed with a toothed sector, G, which takes into teeth formed on the rod D, by which means reciprocating motion may be imparted to the said pump, and the water in the tank A be drawn therefrom, and forced through the pipes H and I.

The pipe I, as also the head $i$ thereof, is fitted with numerous short pipes, $a$ $a$, open to the atmosphere, so that at each stroke of the pump, as the water is forced through the pipe I, the external air will enter the several short pipes $a$ $a$, and mix with the water in its descent into the tank, and thus charge the water in which the fish are with oxygen. The water, as it enters the tank, impinges against a disk, K, fixed to the vessel A, thereby preventing undue agitation of the water in the tank. If desirable, a plain collar, L, at fig. 4, may be used in the place of the piece $i$.

Having now fully described my invention, and the manner of construction and operation, I hereby declare that what I claim, and desire to secure by Letters Patent, is as follows:

I claim pumping or otherwise forcing and mixing air with sea-water, contained in tanks, in which salt-water fish are placed, for the purpose of keeping such fish alive, substantially as above described.

ANTON JULIUS SMIDTH.

Witnesses:
W. HEILBERG, *King's Physician.*
CONR. SEIDELIN, *Architect, Copenhagen.*